Figure 1:
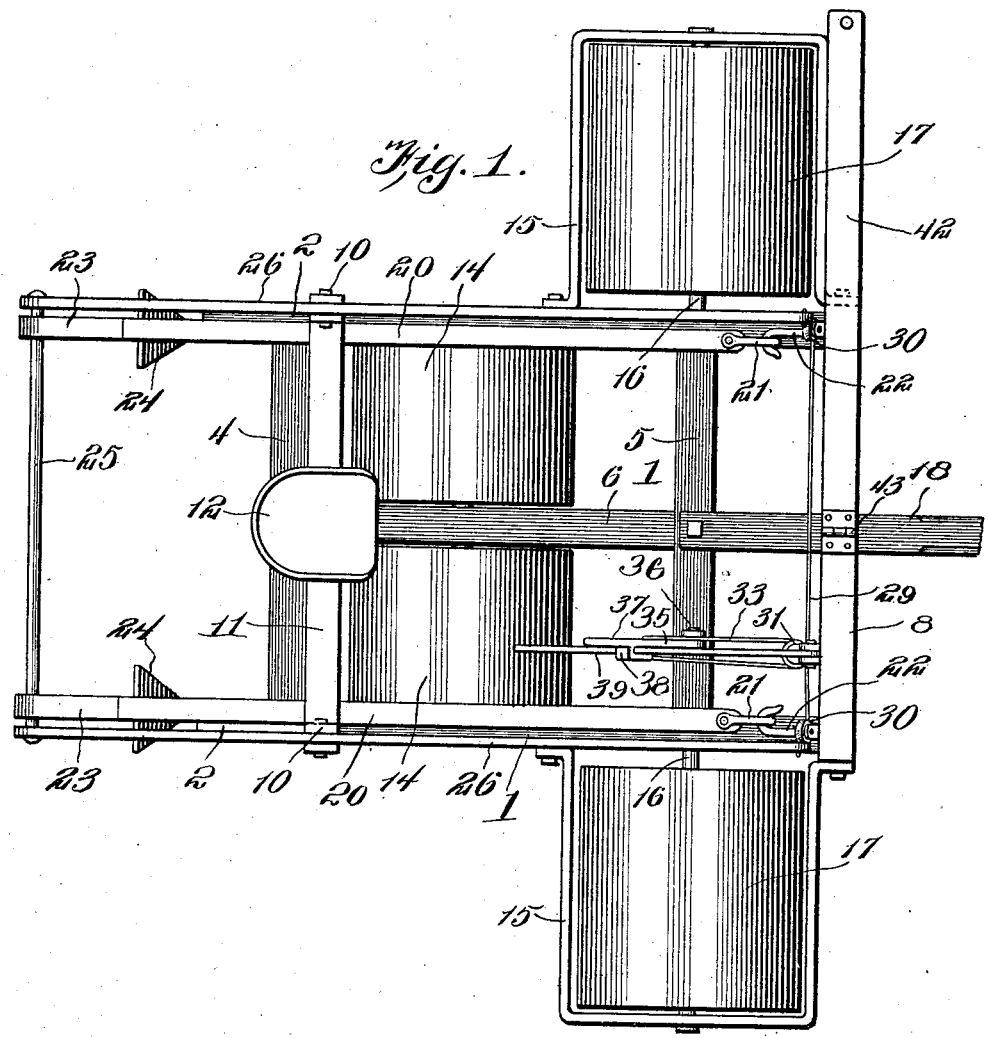

J. ROSS.
LAND ROLLER AND CULTIVATOR.
APPLICATION FILED MAY 13, 1908.

903,782.

Patented Nov. 10, 1908.

2 SHEETS—SHEET 1.

Witnesses

Inventor
Jacob Ross
By Victor J. Evans
Attorney

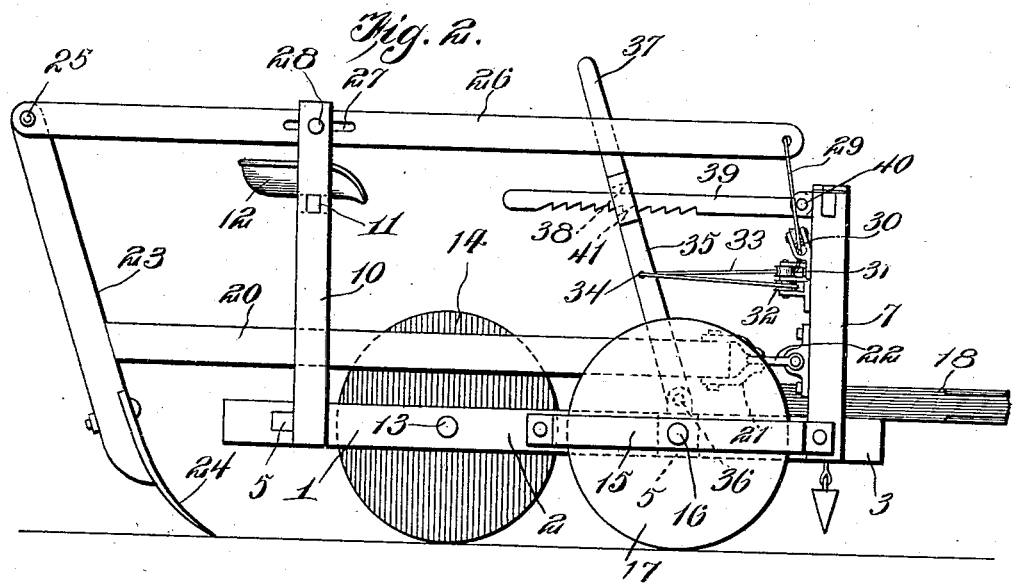
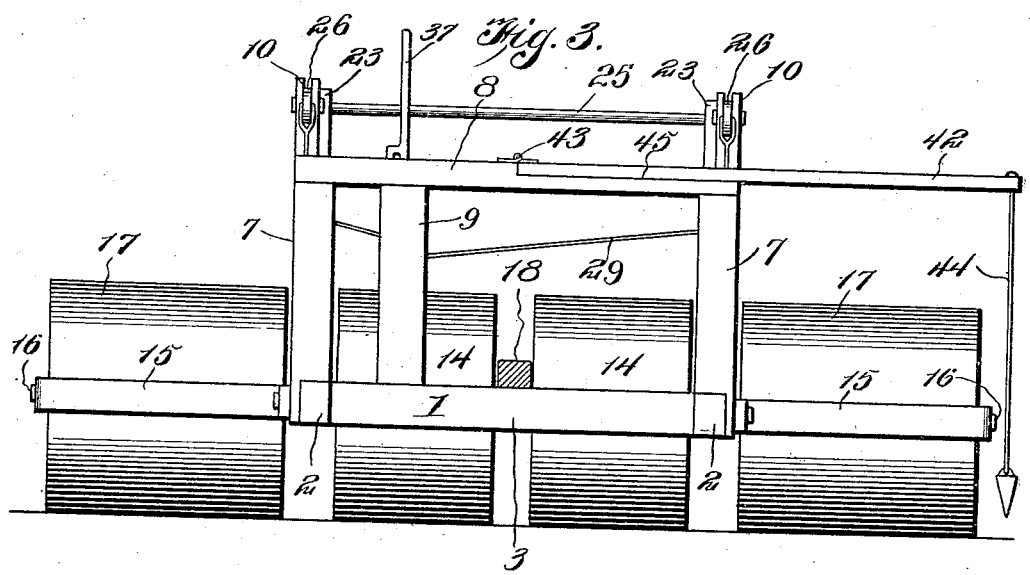

UNITED STATES PATENT OFFICE.

JACOB ROSS, OF HOLLAND, MISSOURI.

LAND-ROLLER AND CULTIVATOR.

No. 903,782.  Specification of Letters Patent.  Patented Nov. 10, 1908.

Application filed May 13, 1908. Serial No. 432,638.

*To all whom it may concern:*

Be it known that I, JACOB ROSS, a citizen of the United States of America, residing at Holland, in the county of Pemiscot and State of Missouri, have invented new and useful Improvements in Land-Rollers and Cultivators, of which the following is a specification.

This invention relates to land rollers and cultivators, contemplating particularly the provision of a device for rolling the plowed ground of a field and furrowing or laying off the same into hill rows for corn planting.

One object of the invention is to provide an apparatus of this character whereby these operations may be simultaneously performed, or the device used solely for rolling and smoothing the surface of the ground and covering seed, such as grass seed, etc., in broadcast sowing.

Another object is to provide an apparatus in which the hill or furrow forming shovels may be raised and lowered in a convenient manner for deep or shallow work, or to throw them entirely out of operation, which apparatus is of simple construction, efficient in use and comparatively inexpensive of production, and adapted to be employed for a variety of other useful purposes.

With these and other objects in view, the invention consists of the features of construction, combination and arrangement of parts hereinafter fully described and claimed, reference being had to the accompanying drawing, in which:—

Figure 1 is a top plan view of the device. Fig. 2 is a side elevation of the same. Fig. 3 is a front elevation.

Referring to the drawings, 1 designates the main frame of the apparatus which comprises a pair of longitudinal side bars 2, connected by front, rear and intermediate cross bars 3, 4 and 5, the bars 4 and 5 being further connected and braced by a central longitudinal bar 6. Rising from the forward ends of the bars 2 are uprights 7 connected at their upper ends by a cross-piece 8, which is connected with and reinforced from the bar 3 by a vertical brace 9. From the rear ends of the bars 2 extend uprights 10 connected at a point below their upper ends by a transverse seat bar 11 which carries the driver's seat 12.

An axle 13 is journaled at its ends in the bars 2 and extends through and is centrally journaled in the bar 6, and journaled on this axle between the respective bars are ground rollers 14, disposed on opposite sides of the longitudinal center and at a point in rear of the transverse center of the frame. These rollers 14 support the frame and operate to break up the clods and compact that portion of the ground over which the frame travels. Secured to the outer sides of the forward ends of the bars 2 are horizontally arranged U-shaped or looped brackets 15 which form bearings for the outer ends of axles 16 which are journaled at their inner ends in said bars 2 and support ground wheels or rollers 17, which are thus arranged to operate upon the soil at a point in advance of the rollers 14 and beyond the sides of the frame, and serve also to prevent tilting of the frame on the axle of the rollers 14. A draft tongue 18 is secured in any preferred manner to the bars 3 and 5.

Mounted upon the main frame is a supplemental swinging frame comprising a pair of side bars 20 extending longitudinally above the bars 2 and provided at their forward ends with clevises 21 pivotally and detachably engaging hooks 22 pivotally mounted upon the rear faces of the uprights 7 to permit said supplemental frame to swing vertically. Standards 23 are rigidly secured to the rear ends of the bars 20 beyond the rear end of the main frame and carry at their lower ends hoes or shovels 24, spaced a distance apart equivalent to the width of the frame and designed for use in forming furrows in the production of hill rows for preparing a field for the planting of corn.

The upper ends of the standards 23 are connected by a transverse rod 25, to the projecting ends of which are pivotally connected the rear ends of link bars 26, each of which is provided with a longitudinal slot 27 for the reception of a pin or bolt 28, whereby the link bars are pivotally and slidably connected with the upper extended ends of the uprights 10. To the forward ends of the link bars are attached the ends of a rope or cable 29 which extend downwardly and inwardly around guide pulleys 30 on the uprights 7 and thence across and around guide pulleys 31 and 32 mounted one above the other upon the brace bar 9, the intermediate portion of said rope or cable being thus arranged in the form of a loop 33 which passes loosely through an opening 34 in an adjusting lever 35 pivoted at its lower end to the bar 5, as at 36, and having its upper end formed to provide a suitable handle 37. By this construction when the lever is swung rearwardly from a vertical position, the ends of the rope or cable will be drawn upon to swing the forward ends of the link bars 26 downward, whereby the rear ends of said link bars will be swung upward to elevate the supplemental frame and plows, the said supplemental frame swinging on its pivot connections 21 and 22, while the link bars have a sliding and swinging motion on the bolts 28 through the provision of the slots 27 therein, and the intermediate portion of the rope or cable runs rearward in contact with the pulleys 31 and 32, resulting in an extension or lengthening of the loop 33.

The lever is provided at one side with a guide 38 to slidably receive a rack tooth bar 39 pivoted at its forward end, as at 40, to the bar 8, the lower wall of said guide, which latter is in the form of a slot, forming a locking seat or projection 41 to engage the teeth of the bar, whereby the lever may be fastened in a variety of adjusted positions, thus enabling the supplemental frame to be operated and controlled to cause the plows 24 to penetrate the soil to a greater or less depth and to elevate the same wholly above the surface of the ground when the use of the plow is not required. The connections of the supplemental frame and link bars permit these parts, together with the shovels attached thereto, to be removed from the main frame, so that the device may be employed solely as a ground roller, in which event both the lever and the rack, through their pivotal connections with the frame, may be swung downward or folded to an inoperative position out of the way of the driver or operator. A bar 42 is hinged or pivoted at its inner end, as at 43, to the center of the front cross bar 8 and extends at its other end beyond the adjacent side of the frame and carries a suitable type of depending marking device 44 for an obvious purpose. The bar 8 is recessed or has its upper surface cut away, as at 45, to receive the bar 42 so that its upper surface may lie flush with the surface of said bar 8.

In operation, it will be apparent that the apparatus may be employed for rolling and packing the surface of the ground and breaking up all clods and large particles of the soil, and simultaneously for furrowing or forming hill rows to prepare the ground for corn planting. By elevating or removing the supplemental frame and plows, the apparatus may be employed solely for rolling and packing the soil either for leveling or covering grass and other seed in broadcast sowing. Through the arrangement of the sets of rolls, the rollers 14 operating on the portion of the ground over which the frame travels and the rollers 15 operating at points beyond the sides of the frame, a large amount of surface may be covered in one operation, thus increasing the convenience and efficiency of the apparatus.

Having thus fully described the invention, what is claimed as new is:—

1. An apparatus of the character described, comprising a main frame provided with ground rolls, a supplemental frame pivotally and detachably connected with the main frame and carrying shovels arranged in rear of the latter, link bars slidably and pivotally connected with the main frame and pivotally connected with the supplemental frame, adjusting means connected with said bars, and a locking means for said adjusting means.

2. An apparatus of the character described, comprising a main frame provided with ground rolls, upright portions at the front and rear of said main frame, a supplemental frame extending longitudinally of the main frame and pivotally and detachably connected at its forward end with the front upright portion and carrying shovels at its rear end arranged in rear of the main frame, link bars slidably and pivotally connected with the rear upright portion of the main frame and pivotally connected at its rear end with the supplemental frame, a pivoted operating lever on the main frame provided with a locking device, a pivoted rack bar on the front upright portion adapted to be engaged by the locking device of the lever, guides on the front upright portion, and a flexible connection between the front ends of the link bars and the lever, said connection passing through said guides.

3. In an apparatus of the character described, the combination of a main frame provided with ground rolls and having upwardly projecting front and rear portions, ground rollers journaled on and supporting said frame, a supplemental frame pivotally connected to the upwardly projecting front portion of the main frame and extending rearwardly therefrom and carrying shovels at its rear end, link bars slidably mounted upon the rear upwardly extending portion of the main frame and pivotally connected at their rear ends with the supplemental frame, guide pulleys on the front of the main frame, a lever pivoted to said main frame, a flexible connection between said lever and the link bars passing around said pulleys, said lever being provided with a locking element, and a pivoted rack bar on the main frame adapted to be engaged by said locking element.

In testimony whereof I affix my signature in presence of two witnesses.

JACOB ROSS.

Witnesses:
 ROBT. SALVE,
 H. E. DOERNER.